May 2, 1933. J. W. MORRISON 1,907,407

FIBER PAN OR THE LIKE

Filed Feb. 16, 1931

Inventor:
John W. Morrison
by his Attorneys
Howson & Howson

Patented May 2, 1933

1,907,407

UNITED STATES PATENT OFFICE

JOHN W. MORRISON, OF OCEAN CITY, NEW JERSEY

FIBER PAN OR THE LIKE

Application filed February 16, 1931. Serial No. 516,189.

This invention relates to new and useful improvements in dishes and more particularly to dishes composed of fibrous material such as paper or paper composition and adapted for use in the baking of pies and other products.

One object of the invention is to provide a fibrous dish or plate having a sufficiently rigid peripheral rim to insure maintenance of the round or other shape, in which it is originally molded and to prevent subsequent warping or distortion under any normal conditions of its use for baking or allied purposes.

Another object is to provide a paper or similar baking dish or plate which will not char under normal conditions, and which, by reason of this and other inherent characteristics, will be well adapted for use with standard baking apparatus as hereinafter set forth.

The invention further contemplates the provision of a generally improved dish of paper or like fibrous material for general purposes.

Dishes of paper and like fibrous material, while used to some extent in the baking industry, have never been entirely satisfactory by reason of certain inherent physical limitations. These plates, for example, have a marked tendency to warp either before use or during the baking operations in which they are subjected to relatively high temperatures. This tendency to warp sharply restricts the utility of this type of plate in the baking of certain products, such as pies, wherein it is essential that the plate in which the pie is baked shall be perfectly flat and wherein it is also essential, in order to render the plate suitable for use with the rotary trimming knives of modern baking machinery, that the original true round peripheral shape be maintained, and that the peripheral edge be such as to form a suitable bearing for the blades. Paper and fiber dishes also have a tendency to char at the peripheral edges when subjected to baking temperatures. In addition to the above, these plates, as previously manufactured, are relatively weak and flimsy and present a relatively undesirable appearance.

I have discovered that the foregoing undesirable physical characteristics of paper and fibre containers in general may be substantially entirely eliminated by suitably attaching to or binding the peripheral edge of the container with a metallic rim, this rim preferably being attached in the process of manufacture of the container and forming in effect an integral and non-detachable part thereof. When so bound, a baking plate will maintain its original round form under all normal conditions of use and will be free from the usual tendency to warp. The tendency to char at the edges is also eliminated, and by reason of this fact and the reinforcing effect resulting from the rim, it is possible to construct an entirely practical baking dish of a relatively inexpensive and light fibrous material with assurance that the dish shall meet all the rigid requirements of use as a baking receptacle. My invention, therefore, not only produces a dish which will be found highly practical for use in the baking industry, but the article may be produced at an actually lower cost than the corresponding article as made in accordance with the prior practice. The metallic rim also adapts the plate for use with the rotary trimming blades of modern pie baking apparatus and so reinforces the plate as to materially increase its general utility.

Figure 1:
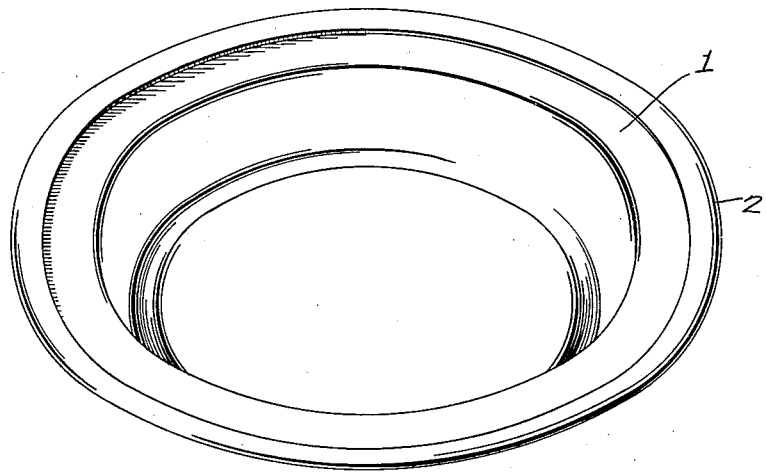
Figure 1 is a view in perspective of a dish made in accordance with my invention.
Figure 2:
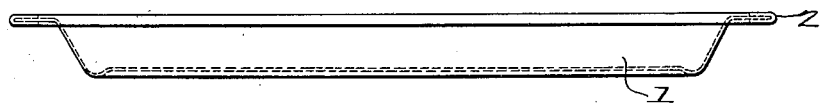
Fig. 2 is an elevational view of the dish.
Figures 3, 4:
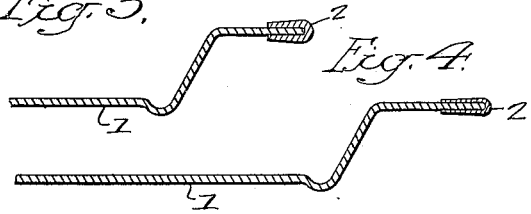
Fig. 3 is a section on line 3—3, Fig. 1, illustrating a step in the application of the metallic rim to the fiber dish.
Fig. 4 is a view similar to Fig. 3 showing a further step in the manufacturing process.
Figure 5:
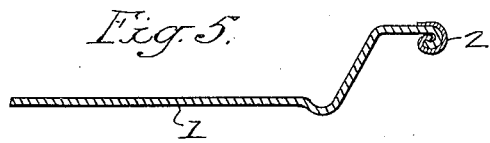
Fig. 5 is a view, also similar to Fig. 3, showing a possible further step in the production of the finished article.

Referring to the drawing, 1 is a dish composed of moulded fibrous material such as paper or the like. The said dish, in the present instance is in the form of a common pie plate, wherein there is a circular base having sides extending obliquely upward and outward therefrom, the upper portion of the sides being formed to constitute a lateral flange disposed in a plane substantially parallel to the plane of the base and offset therefrom. A metallic rim 2 is secured to the outer periphery of the lateral extending flanges of the plate and is rigidly secured in the aforementioned position by subsequently pressing the metal tightly about the fibrous material. The plate may be utilized in this state, although, as a further step in the application of the metallic rim to the fiber plate, the said rim may be suitably turned under as shown in Fig. 5 to strengthen the rim and to form a blunt edge to the finished article. This final operation also provides a desirable gripping point for the person handling the plates, the fingers of the person engaging the under side of the flange of the plate, coming into contact with the turned under portion of the metal rim and being prevented from sliding from the position below the flange.

While I have shown one embodiment of my invention for the purpose of description, it will be apparent that certain changes or modifications will not depart from the spirit of the invention.

I claim:

A baking dish comprising a unitary body of molded pulp having outwardly diverging sides extending upwardly therefrom and terminating in a laterally extending flange, a peripheral metallic rim embracing said flange constituting means for preventing the warping of said dish, and a guide for trimming tools preventing abrasion of the edges of said dish by said tools, said flange having an inturned portion, said inturned portion being curled under the flange, and the rim being curled around the inturned portion to embrace the same.

JOHN W. MORRISON.